(12) United States Patent
Ikeda

(10) Patent No.: US 9,174,461 B2
(45) Date of Patent: Nov. 3, 2015

(54) IMAGE-FORMING METHOD

(71) Applicant: Konica Minolta, Inc., Tokyo (JP)

(72) Inventor: Masashi Ikeda, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/394,396

(22) PCT Filed: Apr. 30, 2013

(86) PCT No.: PCT/JP2013/002895
§ 371 (c)(1),
(2) Date: Oct. 14, 2014

(87) PCT Pub. No.: WO2013/161328
PCT Pub. Date: Oct. 31, 2013

(65) Prior Publication Data
US 2015/0070451 A1    Mar. 12, 2015

(30) Foreign Application Priority Data

Apr. 27, 2012    (JP) ................. 2012-103213

(51) Int. Cl.
| | |
|---|---|
| *B41J 2/01* | (2006.01) |
| *B41J 11/00* | (2006.01) |
| *B41J 2/155* | (2006.01) |
| *B41M 7/00* | (2006.01) |
| *C09D 11/101* | (2014.01) |
| *C09D 11/322* | (2014.01) |

(52) U.S. Cl.
CPC ................ *B41J 11/002* (2013.01); *B41J 2/155* (2013.01); *B41M 7/0081* (2013.01); *C09D 11/101* (2013.01); *C09D 11/322* (2013.01)

(58) Field of Classification Search
CPC ...... B41J 11/002; B41J 2/155; B41M 7/0081; C09D 11/101; C09D 11/322
USPC ....................................... 347/102, 19
See application file for complete search history.

(56) References Cited

U.S. PATENT DOCUMENTS

| | | | |
|---|---|---|---|
| 2004/0050292 A1* | 3/2004 | Nakajima et al. .......... | 106/31.27 |
| 2008/0180501 A1* | 7/2008 | Ookubo et al. ............... | 347/100 |
| 2009/0038506 A1 | 2/2009 | Odell et al. | |
| 2010/0118095 A1 | 5/2010 | Nakamura | |
| 2011/0196057 A1 | 8/2011 | Breton et al. | |

FOREIGN PATENT DOCUMENTS

| | | |
|---|---|---|
| JP | 2009-041015 A | 2/2009 |
| JP | 2010-115791 A | 5/2010 |

(Continued)

*Primary Examiner* — Henok Legesse
(74) *Attorney, Agent, or Firm* — Lucas & Mercanti, LLP

(57) ABSTRACT

An image-forming method that comprises: a process of discharging a radiation-curable inkjet ink, which contains a photopolymerizable compound, a photopolymerization initiator, and a gelling agent and which undergoes a phase transition depending on the temperature, on a recording medium; and a process of curing the radiation-curable inkjet ink discharged on the recording medium by irradiating active radiation thereon. The method performs the irradiation with the active radiation so that the maximum illuminance at the surface of the recording medium is 2-5 W/cm² and in the distribution of illuminance in the irradiated region at the surface of the recording medium in the direction of recording medium conveyance, the half-width of the illuminance is 20 mm or more. Using said image-forming method, productivity is high and images with excellent gloss homogeneity, surface curability and abrasion properties can be formed.

21 Claims, 5 Drawing Sheets

(56) References Cited

FOREIGN PATENT DOCUMENTS

| JP | 2010-150465 A | 7/2010 |
| JP | 2011-162786 A | 8/2011 |
| JP | 2011-168685 A | 9/2011 |
| JP | 2011-231164 A | 11/2011 |
| WO | WO2012/023368 A1 | 2/2012 |
| WO | WO2013/084511 A1 | 6/2013 |

* cited by examiner

IMAGE-FORMING METHOD

CROSS REFERENCE TO RELATED APPLICATION

This Application is a 371 of PCT/JP2013/002895 filed on Apr. 30, 2013 which, in turn, claimed the priority of Japanese Patent Application No. JP2012-103213 filed on Apr. 27, 2012 both applications are incorporated herein by reference.

TECHNICAL FIELD

The present invention relates to an image forming method.

BACKGROUND ART

Inkjet recording methods enable simple and inexpensive image production and have therefore been used for printing of, for example, paints, adhesives, printing inks, circuit board materials, and electrical insulating materials on plastics, paper, woodwork, inorganic materials and other materials. As the inkjet recording method, UV-curable inkjet method is known wherein droplets of ink are landed on a recording medium and then cured by irradiation with ultraviolet rays to form an image. Recently, the UV-curable inkjet method has been attracting attention for its capability of forming images having high rubfastness and adhesiveness even on recording media which lack ink absorbing properties.

As UV-curable inkjet inks having high pinning properties, for example, inks have been proposed which contain a gelling agent and undergo temperature-induced sol-gel phase transition (see, e.g., PTL 1). Specifically, ink droplets that are in liquid state at high temperatures are discharged and landed on a recording medium, and at the same time are cooled for gelation on the recording medium, whereby combining of dots can be prevented.

On the other hand, as a light source for irradiating gelling agent-free UV-curable inks or radically polymerizable curable wax-containing UV-curable inks with ultraviolet rays, ultraviolet ray-emitting diodes (UV-LEDs) have been proposed (see e.g., PTLs 2 and 3).

CITATION LIST

Patent Literature

PTL 1
Japanese Patent Application Laid-Open No. 2009-041015
PTL 2
Japanese Patent Application Laid-Open No. 2010-150465
PTL 3
Japanese Patent Application Laid-Open No. 2011-168685

SUMMARY OF INVENTION

Technical Problem

Conventionally, when the conveyance speed of a recording medium is set high, it is common to irradiate ink with high-illuminance ultraviolet rays by light radiation means having high radiation heat (e.g., metal halide lamp) or light irradiation means having high illuminance (e.g., high illuminance UV-LED) so that the ink is cured in a short time.

However, short-term irradiation of gelling agent-containing inks such as that disclosed in PTL 1 with high-illuminance ultraviolet rays results in a rise in the surface temperature of the recording medium and thus may cause melting of the surface of gelated ink droplets, which reduces the uniformity of glossiness of the obtained image easily.

Moreover, irradiation of ink with high-illuminance ultraviolet rays is likely to generate high concentrations of active radical species in the ink, so that the polymerization of a radical polymerizable compound in the ink is inhibited and therefore the molecular weight does not become large. Thus, surface curability or rubfastness of the obtained image may decrease.

Thus, no inkjet recording method has been known in the art which provides excellent uniformity of glossiness, surface curability and rubfastness even at high-speed recording.

The present invention has been made in view of the circumstances described above, and an object of the present invention is to provide an actinic radiation-curable inkjet ink recording method which can form an image having excellent uniformity of glossiness, surface curability, and rubfastness with high productivity.

Solution to Problem

[1] An image forming method including:
discharging an actinic radiation-curable inkjet ink which undergoes temperature-induced sol-gel phase transition to a recording medium, the actinic radiation-curable inkjet ink containing a photopolymerizable compound, a photopolymerization initiator and a gelling agent; and
curing the discharged actinic radiation-curable inkjet ink on the recording medium by irradiation with actinic radiation, wherein
the irradiation with actinic radiation is carried out so that a maximum illuminance value on a surface of the recording medium is in a range of 2 to 5 $W/cm^2$, and a full width half maximum of illuminance in a distribution of illuminance on an irradiated region of the surface of the recording medium along a conveyance direction of the recording medium is 20 mm or more.
[2] The image forming method according to [1], wherein the irradiation with actinic radiation is carried out using an actinic radiation light source, and a height of a light-emitting surface of the actinic radiation light source from the surface of the recording medium is 30 mm or more and less than 200 mm.
[3] The image forming method according to [1] or [2], wherein an irradiation time during which illuminance on the recording medium surface is 0.1 $W/cm^2$ or more is 0.1 seconds or more.
[4] The image forming method according to any one of [1] to [3], wherein a conveyance speed of the recording medium is 50 m/min or more.
[5] The image forming method according to any one of [1] to [4], wherein an accumulated amount of light of the actinic radiation applied is less than 400 $mJ/cm^2$.
[6] The image forming method according to any one of [2] to [5], wherein the actinic radiation light source is a light-emitting diode with a peak wavelength of in a range of 360 nm to 420 nm.

Advantageous Effects of Invention

An actinic radiation-curable inkjet ink recording method of the present invention can form an image having excellent uniformity of glossiness, surface curability, and rubfastness with high productivity.

DESCRIPTION OF EMBODIMENTS

1. Actinic Radiation-Curable Inkjet Ink

Figure 1A:
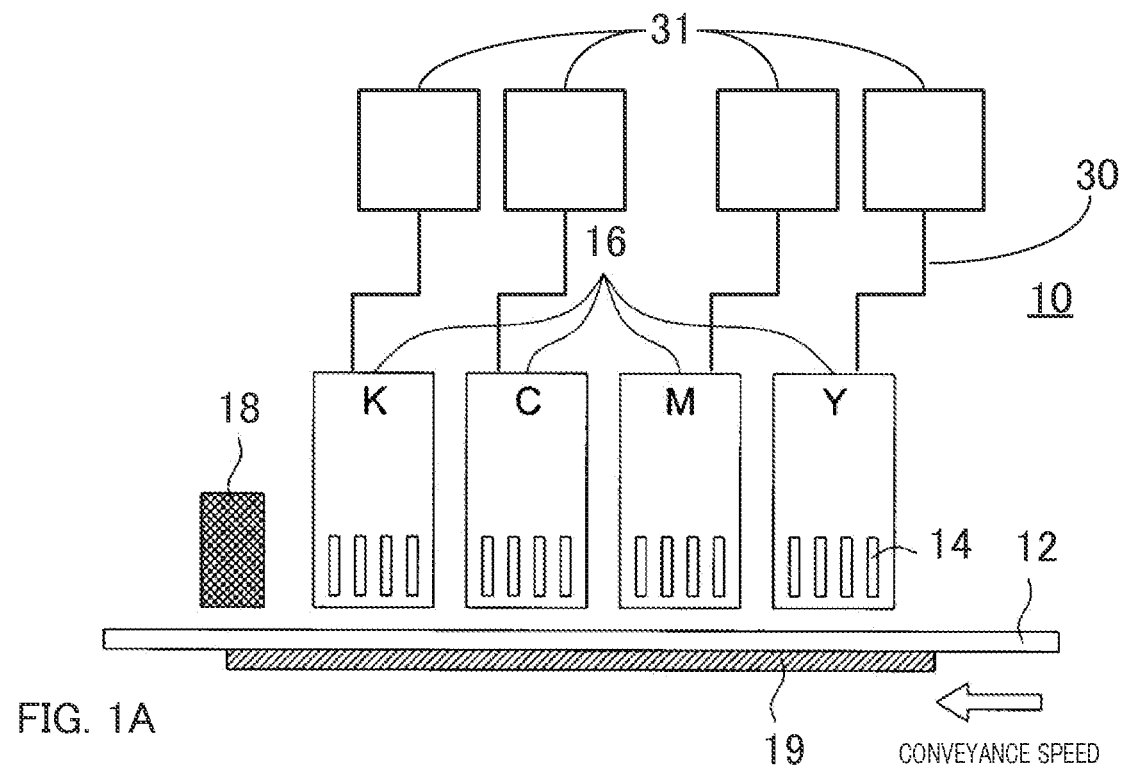
FIG. 1A is a side view illustrating an example of the configuration of a main part in a line recording type inkjet recording apparatus.

The actinic radiation-curable inkjet ink contains at least a photopolymerizable compound, a photopolymerization initiator and a gelling agent.

Photopolymerizable Compound

The photopolymerizable compound is a compound which is crosslinked or polymerized by irradiation with light. The photopolymerizable compound may be used singly or in combination. The photopolymerizable compound is a radical polymerizable compound or a cationic polymerizable compound, and is preferably a radical polymerizable compound.

The radical polymerizable compound is a compound (monomer, oligomer, polymer or mixture of these) which has an ethylenically unsaturated bond which is radically polymerizable. The radical polymerizable compound may be used singly or in combination.

Examples of the compounds having an ethylenically unsaturated bond which is radically polymerizable include unsaturated carboxylic acids and salts thereof, unsaturated carboxylic ester compounds, unsaturated carboxylic urethane compounds, unsaturated carboxylic amide compounds, acrylonitrile, styrene, unsaturated polyesters, unsaturated polyethers, unsaturated polyamides, and unsaturated urethanes. Examples of the unsaturated carboxylic acids include (meth) acrylic acid, itaconic acid, crotonic acid, isocrotonic acid, and maleic acid.

Among the foregoing, the radical polymerizable compound is preferably an unsaturated carboxylic ester compound and more preferably a (meth)acrylate compound. The (meth)acrylate compound may be a monomer, an oligomer, a mixture or a modified product of a monomer and an oligomer, or an oligomer having a polymerizable functional group. The (meth)acrylate compound may be used singly or in combination.

For increasing curability, the (meth)acrylate compound preferably has two or more (meth)acrylate groups in the molecule.

For increasing compatibility with a gelling agent having high hydrophobicity, the (meth)acrylate compound preferably includes a (meth)acrylate compound having a C log P value in a range of 4.0 to 7.0. The (meth)acrylate compound having a C log P value in a range of 4.0 to 7.0 is preferably 1) a (meth)acrylate compound with a functionality of 3 or more, which has a structure represented by (—C(CH$_3$)H—CH$_2$—O—)$_m$ (where m is an integer of 3 to 14) in the molecule, or 2) a (meth)acrylate compound with a functionality of 2 or more, which has a cyclic structure in the molecule. These (meth) acrylate compounds have high photocurability and do not shrink easily when cured, and therefore may improve reproducibility of sol-gel phase transition.

1) The (meth)acrylate compound with a functionality of 3 or more, which has a structure represented by (—C(CH$_3$)H—CH$_2$—O—)$_m$ (where m is an integer of 3 to 14) in the molecule may be a compound obtained by modifying a hydroxyl group of a compound having three or more hydroxyl groups with propylene oxide and esterifying the obtained modified product with (meth)acrylic acid. Examples of such compounds include 3PO modified trimethylolpropane triacrylate Photomer 4072 (molecular weight: 471, C log P: 4.90, manufactured by Cognis) and 3PO modified trimethylolpropane triacrylate Miramer M360 (molecular weight: 471, C log P: 4.90, manufactured by Miwon).

2) The (meth)acrylate compound with a functionality of 2 or more which has a cyclic structure in the molecule may be a compound obtained by esterifying a hydroxyl group of a compound having two or more hydroxyl groups and tricycloalkane with (meth)acrylic acid. Examples of such compounds include tricyclodecane dimethanol diacrylate (NK ESTER A-DCP, molecular weight: 304, C log P: 4.69), tricyclodecane dimethanol dimethacrylate (NK ESTER DCP, molecular weight: 332, C log P: 5.12), 1,10-decanediol dimethacrylate NK ESTER DOD-N, molecular weight: 310, C log P: 5.75 manufactured by Shin-Nakamura Chemical Co., Ltd.), and nonyl phenol 8EO modified acrylatete Miramer M166 (C log P: 6.42, manufactured by Miwon).

The C log P values for these (meth)acrylate compounds are preferably within a range of 4.0 to 7.0, and more preferably within a range of 4.5 to 6.0. When the C log P value is less than 4.0, an ink containing the compound exhibits hydrophilicity and a gelling agent exhibiting hydrophobicity is difficult to dissolve in the ink. Even heated, it may be difficult for the gelling agent to completely dissolve in such an ink. On the other hand, when the C log P value is more than 7.0, the solubility of the photopolymerization initiator and initiation promoter in the ink may decrease, so that the curability and discharge stability from the inkjet recording head may decrease.

As used herein, the term "Log P value" is a coefficient indicating the affinity of an organic compound to water and 1-octanol. The 1-octanol/water partition coefficient P is a partition equilibrium achieved when a trace amount of a compound dissolves as a solute in a two-liquid phase solvent of 1-octanol and water, and the partition coefficient P is the ratio of equilibrium concentrations of the compound in the respective solvents, and is expressed as Log P, the logarithm to the base 10 of the partition coefficient. That is, the log P value is a logarithmic value of the partition coefficient of 1-octanol/water, and is known as an important parameter indicating the hydrophilicity and hydrophobicity of a molecule.

"C log P" is a Log P value found by calculation. The C log P value can be calculated by the fragment method, atomic approach method or the like. More specifically, in order to calculate the C log P value, the fragment method described in literatures (C. Hansch and A. Leo, "Substituent Constants for Correlation Analysis in Chemistry and Biology" (John Wiley & Sons, New York, 1969)), or commercially available software package 1 or 2 described below may be used.

Software package 1: MedChem Software (Release 3.54, August 1991, Medicinal Chemistry Project, Pomona College, Claremont, Calif.)

Software package 2: ChemDraw Ultra Ver. 8.0. (April 2003, CambridgeSoft Corporation, USA)

The C log P value as used herein is preferably the value calculated using software package 2.

The content of the (meth)acrylate compound having the C log P value of 4.0 to 7.0 in the actinic radiation-curable inkjet ink is preferably in a range of 10 to 40 wt % and more preferably in a range of 15 to 35 wt %. If the content of the (meth)acrylate compound is less than 10 wt %, the ink exhibits hydrophilicity and the solubility of the gelling agent, which exhibits hydrophobicity, may easily decrease. Further, if the content of the (meth)acrylate compound is more than 40 wt %, high shrinkage may occur at curing of ink droplets, and the printed matter may be curled. Accordingly, the image is easily torn when the image is bent.

The (meth)acrylate compound may have other (meth)acrylate compound(s). Examples of other (meth)acrylate compounds include ethylene oxide-modified (meth)acrylate compounds. The ethylene oxide-modified (meth)acrylate compounds have high photosensitivity and easily form a later-described card house structure upon geleation at a low temperature.

Examples of ethylene oxide-modified (meth)acrylate compounds include 4EO modified hexanediol diacrylate CD561 (molecular weight: 358), 3EO modified trimethylolpropane triacrylate SR454 (molecular weight: 429), 6EO modified trimethylolpropane triacrylate SR499 (molecular weight: 560) and 4EO modified pentaerythritol tetraacrylate SR494 (molecular weight: 528) (all manufactured by Sartomer Company, Inc.); polyethylene glycol diacrylate NK ESTER A-400 (molecular weight: 508), NK ESTER A-600 (molecular weight: 742), polyethylene glycol dimethacrylate NK ESTER 9G and NK ESTER 14G (all manufactured by Shin-Nakamura Chemical Co., Ltd.); and tetraethylene glycol diacrylate V#335HP manufactured by OSAKA ORGANIC CHEMICAL INDUSTRY LTD.

The molecular weight of the photopolymerizable compound included in the actinic radiation-curable inkjet ink is preferably in a range of 280 to 1,500, and more preferably in a range of 300 to 800. An ink including a photopolymerizable compound having a molecular weight less than 280 and a gelling agent shows large change in its viscosity near a discharge temperature. On the other hand, an ink including a photopolymerizable compound having a molecular weight more than 1,500 and a gelling agent has large sol viscosity so that it is not suitable as an inkjet ink.

The total content of the photopolymerizable compound in the actinic radiation-curable inkjet ink is preferably 1 to 97%, and more preferably 30 to 95%.

Gelling Agent

The gelling agent contained in the actinic radiation-curable inkjet ink has a function of causing the ink to undergo temperature-induced reversible sol-gel phase transition. Such a gelling agent is required to satisfy at least the followings requirements: 1) the gelling agent dissolves in a photopolymerizable compound or the like at a temperature higher than the gelation temperature and 2) the gelling agent is crystallized in the ink at a temperature lower than the gelation temperature.

When the gelling agent is crystallized in an ink, it is preferable that a space three-dimensionally surrounded by plate-like crystals, crystallization products of the gelling agent, is formed so that the photopolymerizable compound is included in that space. A structure in which a photopolymerizable compound is included in a space three-dimensionally surrounded by plate-like crystals can be referred to as a "card house structure." Once a card house structure is formed, the liquid photopolymerizable compound can be maintained and ink droplets can be pinned. Accordingly, combining of liquid droplets can be prevented.

It is preferable that the photopolymerizable compound and the gelling agent dissolving in the sol-like ink are compatible each other to form the card house structure. On the other hand, if phase separation between the photopolymerizable compound and the gelling agent dissolved in the ink occurs, the card house structure may be difficult to form.

Examples of the gelling agents include aliphatic ketone compounds; aliphatic ester compounds; petroleum-based waxes such as paraffin wax, microcrystalline wax and petrolactam; plant waxes such as candelilla wax, carnauba wax, rice wax, wood wax, jojoba oil, jojoba solid wax and jojoba esters; animal waxes such as beewax, lanolin and whale wax; mineral waxes such as montan wax and hydrogenated waxes; hardened castor oil or hardened castor oil derivatives; modified waxes such as montan wax derivatives, paraffin wax derivatives, microcrystalline wax derivatives, and polyethylene wax derivatives; higher fatty acids such as behenic acid, arachidic acid, stearic acid, palmitic acid, myristic acid, lauric acid, oleic acid, and erucic acid; higher alcohols such as stearyl alcohol and behenyl alcohol; hydroxystearic acids such as 12-hydroxystearic acid; 12-hydroxystearic acid derivative; fatty acid amides such as lauric acid amide, stearic acid amide, behenic acid amide, oleic acid amide, erucic acid amide, ricinolic acid amide, and 12-hydroxystearic acid amide (e.g., NIKKAMIDE series manufactured by Nippon Kasei Chemical Co., Ltd.; ITOHWAX series manufactured by Itoh Oil Chemicals Co., Ltd., and FATTYAMID series manufactured by Kao Corp.); N-substituted fatty acid amides such as N-stearylstearic acid amide and N-oleylpalmitic acid amide; special fatty acid amides such as N,N'-ethylenebis (stearylamide), N,N'-ethylenebis(12-hydroxystearylamide), and N,N'-xylylenebisstearyl amide; higher amines such as dodecylamine, tetradecylamine, and octadecyl amine; fatty acid ester compounds such as a stearylstearic acid, an oleylpalmitic acid, glycerin fatty acid esters, sorbitan fatty acid esters, propylene glycol fatty acid esters, ethylene glycol fatty acid esters, and polyoxyethylene fatty acid esters (e.g., EMALLEX series produced by Nippon Emulsion Co., Ltd., RIKEMAL series produced by Riken Vitamin Co., Ltd., and POEM series produced by Riken Vitamin Co., Ltd); sucrose fatty acid esters such as sucrose stearate and sucrose palmitate (e.g., RYOTO Sugar Ester series, manufactured by Mitsubishi Kagaku Foods Corp.); synthetic waxes such as polyethylene wax and α-olefin-maleic anhydride copolymer wax (e.g., UNILIN series, manufactured by Baker Petrolite Corp.); dimer acids; and dimer diols (e.g., PRIPOR series, manufactured by Croda International PLC); fatty acid inulins such as stearoyl inulin; fatty acid dextrins such as dextrin palmitate and dextrin myristate (e.g., RHEOPEARL series, manufactured by Chiba Flour Milling Co., Ltd.); glyceryl behenate eicosanedioate and polyglyceryl eicosane behenate (e.g., NOMCORT series, manufactured by Nisshin Oillio Group, Ltd.); amide compounds such as N-lauroyl-L-glutamic acid dibutylamide and N-(2-ethylhexanoyl)-L-glutamic acid dibutylamide (available from Ajinomoto Fine-Techno Co., Inc.); dibenzylidene sorbitols such as 1,3:2,4-bis-O-benzylidene-D-glusitol (GEL ALL D, available from New Japan Chemical Co., Ltd.); and low-molecular weight oil gelling agents described in Japanese Patent Application Laid-Open Nos. 2005-126507, 2005-255821 and 2010-111790.

The gelling agent is preferably a compound having an alkyl chain having 12 or more carbon atoms such that the above "card house structure" can be easily formed. The alkyl chain of the compound may be branched.

The compound having a straight alkyl group having 12 or more carbon atoms may be an aliphatic ketone compound, an aliphatic ester compound, a higher fatty acid, a higher alcohol or a fatty acid amide, each having a straight alkyl group having 12 or more carbon atoms. However, higher fatty acids, higher alcohols, fatty acid amides and the like have a polar group such as —OH, or —COOH at the terminal of the alkyl chain, so that stability in a sol state ink is low and thus precipitation or layer separation may occur. Also elution of the gelling agent from the cured film may occur. Therefore, the gelling agent is preferably an aliphatic ketone compound or an aliphatic ester compound. That is, a compound represented by the following Formula (1) or (2) is preferable.

R1—CO—R2   Formula (G1):

R3—COO—R4   Formula (G2):

In the Formulas (G1) and (G2), R1 to R4 each independently represent an alkyl chain having a straight-chain moiety having 12 or more carbon atoms. R1 to R4 may also have a branch moiety.

In the Formula (G1), hydrocarbon groups represented by R1 and R2 are preferably independently an aliphatic hydrocarbon group containing a straight-chain moiety having 12 to 25 carbon atoms. When the aliphatic hydrocarbon group represented as R1 or R2 has fewer than 12 carbon atoms in the straight-chain moiety, the aliphatic hydrocarbon group does not have enough crystallinity, so that the compound may fail not only to function as a gelling agent, but also to form enough space to retain a photopolymerizable compound in the above card house structure. On the other hand, if the aliphatic hydrocarbon group has more than 25 carbon atoms in the straight-chain moiety, the melting point becomes so high that the gelling agent may not dissolve in the ink unless the discharge temperature of the ink is high enough.

Examples of aliphatic ketone compounds represented by the Formula (G1) include dilignoceryl ketone (C24-C24), dibehenyl ketone (C22-C22, melting point: 88° C.), distearyl ketone (C18-C18, melting point: 84° C.), dieicosyl ketone (C20-C20), dipalmityl ketone (C16-C16, melting point: 80° C.), dimyristyl ketone (C14-C14), dilauryl ketone (C12-C12, melting point: 68° C.), lauryl myristyl ketone (C12-C14), lauryl palmityl ketone (C12-C16), myristyl palmityl ketone (C14-C16), myristyl stearyl ketone (C14-C18), myristyl behenyl ketone (C14-C22), palmityl stearyl ketone (C16-C18), palmityl behenyl ketone (C16-C22), stearyl behenyl ketone (C18-C22).

Examples of the commercially available products of the compound represented by the Formula (G1) include 18-Pentatriaconton (manufactured by Alfa Aeser GmbH & Co KG), Hentriacontan-16-on (manufactured by Alfa Aeser GmbH & Co KG), and Kao wax T1 (manufactured by Kao Corporation).

The aliphatic ketone compounds contained in the actinic radiation-curable inkjet ink may be used singly or in combination.

In the Formula (G2), hydrocarbon groups represented by R3 and R4 are preferably, but not limited to, independently an aliphatic hydrocarbon group containing a straight-chain moiety having 12 to 26 carbon atoms. When the aliphatic hydrocarbon groups represented by R3 and R4 have 12 to 26 carbon atoms in the straight-chain moiety, as with the compounds represented by Formula (G1), the compound has enough crystallinity as a gelling agent, can form the above card house structure, and the melting point is not too high.

Examples of the compounds represented by Formula (G2) include behenyl behenate (C21-C22, melting point: 70° C.), icosyl icosanoate (C19-C20), stearyl stearate (C17-C18, melting point: 60° C.), palmityl stearate (C17-C16), lauryl stearate (C17-C12), cetyl palmitate (C15-C16, melting point: 54° C.), stearyl palmitate (C15-C18), myristyl myristate (C13-C14, melting point: 43° C.), cetyl myristate (C13-C16, melting point: 50° C.), octyl dodecyl myristate (C13-C20), stearyl oleate (C17-C18), stearyl erucate (C21-C18), stearyl linolate (C17-C18), behenyl oleate (C18-C22), myricyl cerotate (C25-C16), stearyl montanate (C27-C18), behenyl montanate (C27-C22), arachidyl linolate (C17-C20), and palmityl triacontanate (C29-C16).

Examples of commercially available products of the compound represented by Formula (G2) include UNISTAR M-2222SL (manufactured by NOF Corp.), EXCEPARL SS (manufactured by Kao Corp., melting point: 60° C.), EMALEX CC-18 (manufactured by Nihon-Emulsion Co., Ltd.), AMREPS PC (manufactured by Kokyu Alcohol Kogyo Co., Ltd.), EXCEPARL MY-M (manufactured by Kao Corp.), SPERMACETI (manufactured by NOF Corp.), and EMALEX CC-10 (manufactured by Nihon Emulsion Co., Ltd.). Since many of these commercially available products are mixtures of two or more types, the commercially available products may be separated and purified if necessary.

The aliphatic ester compounds contained in the actinic radiation-curable inkjet ink may be used singly or in combination.

The content of the gelling agent in the actinic radiation-curable inkjet ink is preferably in a range of 0.5 to 7.0 wt % and more preferably in a range of 1.0 to 5.0 wt % to the total weight of the ink. If the content is less than 0.5 wt %, the ink droplet may not undergo gelation (undergo temperature-induced sol-gel phase transition) sufficiently. On the other hand, if the content is more than 7.0 wt %, hardness of the obtained cured film is not sufficient and the surface of the film may be scarred.

Photopolymerization Initiator

Photopolymerization initiator contained in the actinic radiation-curable inkjet ink is an intramolecular bond cleavage type initiator or an intramolecular hydrogen abstraction type initiator.

Examples of the intramolecular bond cleavage type photopolymerization initiators include acetophenones such as diethoxy acetophenone, 2-hydroxy-2-methyl-1-phenyl propan-1-one, benzyl dimethyl ketal, 1-(4-isopropyl phenyl)-2-hydroxy-2-methyl propan-1-one, 4-(2-hydroxy ethoxy)phenyl-(2-hydroxy-2-propyl) ketone, 1-hydroxy cyclohexyl phenyl ketone, 2-methyl-2-morpholino-(4-thio methylphenyl) propan-1-one, and 2-benzyl-2-dimethylamino-1-(4-morpholino phenyl)-butanone; benzoins such as benzoin, benzoin methyl ether and benzoin isopropyl ether; acyl phosphine oxides such as 2,4,6-trimethyl benzoin diphenyl phosphine oxide; benzyl, and methylphenyl glyoxy ester.

Examples of the intramolecular hydrogen abstraction type photopolymerization initiators include benzophenones such as benzophenone, o-benzoyl benzoic acid methyl-4-phenyl benzophenone, 4,4'-dichloro benzophenone, hydroxy benzophenone, 4-benzoyl-4'-methyldiphenyl sulfide, acrylated benzophenone, 3,3',4,4'-tetra-(t-butyl peroxy carbonyl)benzophenone; and 3,3'-dimethyl-4-methoxy benzophenone; thioxanthones such as 2-isopropyl thioxanthone, 2,4-dimethyl thioxanthone, 2,4-diethyl thioxanethon, and 2,4-dichloro thioxanethon;

aminobenzophenones such as Michler's ketone and 4,4'-diethylaminobenzophenone; 10-butyl-2-chloro acridone, 2-ethyl anthraquinone, 9,10-phenanthrene quinone, and camphor quinone.

Among the foregoing, acylphosphine oxide or acyl phosphonate can be preferably used due to a high photosensitivity. Specific examples of the preferred include bis(2,4,6-trimethylbenzoyl)-phenylphosphine oxide and bis(2,6-dimethoxybenzoyl)-2,4,4-trimethyl-pentylphosphine oxide.

The content of the photopolymerization initiator to the total weight of the ink is preferably in a range of 0.1 to 10 wt %, and more preferably in a range of 2 to 8 wt %.

The actinic radiation-curable inkjet ink may further contain a photoacid generating agent as a photopolymerization initiator. As such photoacid generating agent, a compound used for chemical amplification type photoresists or photocationic polymerization is used (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

If necessary, the actinic radiation-curable inkjet ink may further contain a photopolymerization initiator auxiliary agent, a polymerization inhibitor, or the like.

The photopolymerization initiator auxiliary agent may be a tertiary amine compound and is preferably an aromatic tertiary amine compound. Examples of the aromatic tertiary amine compounds include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxy ethylaniline, triethylamine, and N,N-dimethyl hexylamine Among them, N,N-dimethylamino-p-benzoic acid ethyl ester and N,N-dimethylamino-p-benzoic acid isoamyl ethyl ester are preferable. These compounds may be used singly or in combination.

Examples of the polymerization inhibitors include (alkyl) phenol, hydroquinone, catechol, resorcin, p-methoxyphenol, t-butyl catechol, t-butyl hydroquinone, pyrogallol, 1,1-picrylhydrazyl, phenothiazine, p-benzoquinone, nitrosobenzene, 2,5-di-tert-butyl-p-benzoquinone, dithiobenzoyl disulfide, picric acid, cupferrone, aluminum N-nitrosophenyl hydroxylamine, tri-p-nitrophenylmethyl, N-(3-oxyanilino-1,3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

Colorant

The actinic radiation-curable inkjet ink may further contain a colorant. The colorant may be a dye or a pigment and preferably a pigment.

Examples of the pigments which may be contained in the actinic radiation-curable inkjet ink are listed below.

C.I. Pigment Yellow 1, 2, 3, 12, 13, 14, 16, 17, 73, 74, 75, 81, 83, 87, 93, 95, 97, 98, 109, 114, 120, 128, 129, 138, 150, 151, 154, 155, 180, 185, 213
C.I. Pigment Red 5, 7, 12, 22, 38, 48:1, 48:2, 48:4, 49:1, 53:1, 57:1, 63:1, 101, 112, 122, 123, 144, 146, 168, 184, 185, 202
C.I. Pigment Violet 19, 23
C.I. Pigment Blue 1, 2, 3, 15:1, 15:2, 15:3, 15:4, 18, 22, 27, 29, 60
C.I. Pigment Green 7, 36
C.I. Pigment White 6, 18, 21
C.I. Pigment Black 7

The average particle size of the pigment is preferably from 0.08 to 0.5 μm. The maximum particle size of the pigment is from 0.3 to 10 μm, and preferably from 0.3 to 3 μm. By controlling the particle size of the pigment, clogging in the nozzles of the inkjet recording head can be prevented, and ink storage stability, ink transparency and curing sensitivity can be maintained.

The dye which may be contained in the actinic radiation-curable inkjet ink may be an oil soluble dye or the like. Examples of the oil soluble dyes include the following various dyes.

Examples of magenta dyes include MS Magenta VP, MS magenta HM-1450, HM Magenta HSo-147 (all manufactured by Mitsui-Toatsu Chemicals), AIZEN SOT Red-1, AIZEN SOT Red-2, AIZEN SOT Red-3, AIZEN SOT Pink-1, SPIRON Red GEH SPECIAL (all manufactured by Hodogaya Chemical), RESOLIN Red FB 200%, MACROLEX Red Violet R, MACROLEX ROT5B (all manufactured by Bayer Japan), KAYASET Red B, KAYASET Red 130, KAYASET Red 802 (all manufactured by Nippon Kayaku), PHLOXIN, ROSE BENGAL, ACID Red (all manufactured by Daiwa Kasei), HSR-31, DIARESIN Red K (all manufactured by Mitsubishi-Kasei), and Oil Red (manufactured by BASF Japan).

Examples of cyan dyes include MS Cyan HM-1238, MS Cyan HSo-16, HM Cyan HSo-144, MS Cyan VPG (all manufactured by Mitsui-Toatsu Chemical), AIZEN SOT Blue-4 (manufactured by Hodogaya Chemical Company), RESOLIN BR, Blue BGLN 200%, MACROLEX Blue RR, CERES Blue GN, SIRIUS SUPRA TURQ. Blue Z-BGL, SIRIUS SUPRA TURQ. Blue FB-LL 330% (all manufactured by Bayer Japan), KAYASET Blue FR, KAYASET Blue N, KAYASET Blue 814, Turq. Blue GL-5 200, Light Blue BGL-5 200 (all manufactured by Nippon Kayaku), DAIWA Blue 7000, Olosol Fast Blue GL (all manufactured by Daiwa Kasei), DIARESIN Blue P (manufactured by Mitsubishi-Kasei), SUDAN Blue 670, NEOPEN Blue 808, and ZAPON Blue 806 (all manufactured by BASF Japan).

Examples of yellow dyes include MS Yellow HSm-41, Yellow KX-7, Yellow EX-27 (Mitsui-Toatsu Chemical), AIZEN SOT Yellow-1, AIZEN SOT Yellow-3, AIZEN SOT Yellow-6 (all manufactured by Hodogaya Chemical), MACROLEX Yellow 6G, MACROLEX FLUOR. Yellow 10GN (all manufactured by Bayer Japan), KAYASET Yellow SF-G, KAYASET Yellow 2G, KAYASET Yellow A-G, KAYASET Yellow E-G (all manufactured by Nippon Kayaku), DAIWA Yellow 330HB (manufactured by Daiwa Kasei), HSY-68 (manufactured by Mitsubishi-Kasei), SUDAN Yellow 146, and NEOPEN Yellow 075 (all manufactured by BASF Japan).

Examples of Black dyes include MS Black VPC (manufactured by Mitsui-Toatsu Chemical), AIZEN SOT Black-1, AIZEN SOT Black-5 (all manufactured by Hodogaya Chemical), RESORIN Black GSN 200%, RESORIN Black BS (all manufactured by Bayer Japan), KAYASET Black A-N (manufactured by Nippon Kayaku), DAIWA Black MSC (manufactured by Daiwa Kasei), HSB-202 (manufactured by Mitsubishi-Kasei), NEPTUNE Black X60, and NEOPEN Black X58 (all manufactured by BASF Japan).

The content of the pigment or dye to the total weight of the ink is preferably from 0.1 to 20 wt %, and more preferably from 0.4 to 10 wt %. If the content of the colorant is too low, color exhibition of the image obtained is insufficient, and if it is too high, the ink viscosity is increased and the discharge stability may decrease.

The actinic radiation-curable inkjet ink may further contain, as a dispersion promoter, a synergist according to various pigments. The total amount of a dispersant and a dispersion promoter to the pigment is preferably from 1 to 50 wt %.

The actinic radiation-curable inkjet ink is preferably obtained by mixing a pigment dispersion and other ink components in order for the pigment to be dispersed easily in the ink.

The pigment dispersion can be obtained by dispersing a pigment in a dispersion medium. The pigment can be dispersed by using ball mill, sand mill, attritor, roll mill, agitator, Henschel mixer, colloid mill, ultrasound homogenizer, pearl mill, wet jet mill, or paint shaker, for example. When dispersing the pigment, a dispersant may be added. The dispersant is preferably a polymeric dispersant, and examples of the polymeric dispersants include SOLSPERSE series of Avecia Biotechnology, Inc., and PB series of Ajinomoto Fine-Techno Co., Inc.

The dispersion medium for the pigment dispersion can be either a solvent or a photopolymerizable compound. In order to allow the ink to easily undergo gelation immediately after landed on a recording medium, or to limit a reduction in solvent resistance and reduce the problems associated with VOCs in the remaining solvent, the pigment dispersion preferably does not contain a solvent. Therefore, the dispersion medium of the pigment dispersion is preferably a photopolymerizable compound, and a monomer with low viscosity is particularly preferable in view of adaptability to dispersion.

Additional Components

If necessary, the actinic radiation-curable inkjet ink may further contain additional components. The additional components can be various additives and other resins. Examples of the additives include surfactants, leveling agents, matting agents, UV absorbers, IR absorbers, antibacterial agents, and basic compounds that serve to increase the storage stability of ink. Examples of the basic compounds include basic alkali metal compounds, basic alkali earth metal compounds, and basic organic compounds such as amines Examples of other resins include resins for adjusting the physical properties of a cured film; examples thereof include polyester resins, polyurethane resins, vinyl resins, acrylic resins, rubber resins, and waxes.

Physical Properties of Actinic Radiation-Curable Inkjet Ink

Because the actinic radiation-curable inkjet ink contains a gelling agent as described above, it undergoes a temperature-induced reversible sol-gel phase transition. Since a photocurable ink which undergoes sol-gel phase transition is a liquid (sol) at high temperatures (e.g., about 80° C.), the ink can be discharged from an inkjet recording head. Droplets of the actinic radiation-curable inkjet ink discharged at a high temperature undergo gelation by natural cooling after landed on a recording medium. Accordingly, combining of neighboring dots is prevented and thus image quality can be improved.

In order to enhance the ink discharge stability, the viscosity of the ink at a high temperature is preferably the same or lower than a predetermined value. Specifically, the viscosity of the actinic radiation-curable inkjet ink at 80° C. is preferably from 3 to 20 mPa·s. In order to prevent combining of neighboring dots, the ink viscosity at room temperature after landing preferably has a certain value or more. Specifically, the viscosity of the actinic radiation-curable inkjet ink at 25° C. is preferably 1,000 mPa·s or more.

The gelation temperature of the actinic radiation-curable inkjet ink is preferably from 40° C. to 70° C. and more preferably from 50° C. to 65° C. In a case where the discharge temperature is near 80° C., when the gelation temperature of the ink exceeds 70° C., gelation easily occurs at the time of discharge thus reducing discharge stability. On the other hand, when the gelation temperature is lower than 40° C., the ink droplets landed on a recording medium do not easily undergo gelation quickly. The gelation temperature is a temperature when fluidity decrease by gelation of the ink in a sol state in a process of cooling the sol-state ink.

The viscosity at 80° C., viscosity at 25° C. and gelation temperature of the ink can be found by measuring a temperature change in dynamic viscoelasticity of the ink using a rheometer. Specifically, when the ink is heated to 100° C. and cooled to 20° C. with conditions including shear rate of 11.7 (1/s) and temperature decrease rate of 0.1° C./s, a temperature change curve of the viscosity is obtained. Further, the viscosity at 80° C. and the viscosity at 25° C. can be obtained by reading each of the viscosities at 80° C. and 25° C. in the temperature change curve of the viscosity. The gelation temperature can be obtained as a temperature at which the viscosity is 200 mPa·s in the temperature change curve of the viscosity.

As for the rheometer, stress control type rheometer Physica MCR series manufactured by Anton Paar can be used. The diameter of the corn plate may be 75 mm and the corn angle may be 1.0°.

The actinic radiation-curable inkjet ink can be obtained by mixing components, including the above described photopolymerizable compound and gelling agent, under heating. Preferably, the actinic radiation-curable inkjet ink can be obtained by preparing a pigment dispersion in which a colorant (especially a pigment) is dispersed in a portion of the photopolymerizable compound; and mixing the pigment dispersion and ink components including the photopolymerizable compound, photopolymerization initiator and gelling agent.

2. Image Forming Method Using the Actinic Radiation-Curable Inkjet Ink

The image forming method of the present invention includes the steps of 1) discharging an actinic radiation-curable inkjet ink on a recording medium and 2) curing the discharged actinic radiation-curable inkjet ink on the recording medium by irradiating with actinic radiation. The image forming method of the present invention can be performed using, for example, later-described inkjet recording apparatus 10.

Step 1)

Droplets of the actinic radiation-curable inkjet ink are discharged from an inkjet recording head of an inkjet recording apparatus to a recording medium. To enhance discharge stability of the ink droplets, the temperature of the inkjet ink inside the inkjet recording head is preferably set to be higher than the gelation temperature by 10 to 30° C.

When the ink temperature inside the inkjet recording head is lower than (gelation temperature+10)° C., the ink undergoes gelation inside the inkjet recording head or at the surface of a nozzle, and thus discharge stability of the ink droplets may decrease. On the other hand, when the ink temperature inside the inkjet recording head is higher than (gelation temperature+30)° C., the ink is at excessively high temperature, and thus the ink components may be degraded.

The amount of liquid per droplet discharged from each nozzle of the inkjet recording head may vary depending on the resolution of an image. However, it is preferably from 0.5 to 10 pl, and more preferably from 0.5 to 2.5 pl for forming a high-resolution image.

The ink droplets attached on the recording medium are cooled and quickly undergo gelation by sol-gel phase transition. As a result, the ink droplets can be pinned without being scattered. Also oxygen is not easily dispersed in the gelated ink so that oxygen inhibition to the polymerizable compound can be reduced.

The recording medium may be either paper or a resin film. Examples of the paper include coated paper for printing, art paper for printing, wood-free paper, and regular paper. Examples of the resin films include a polyethylene terephthalate film and a vinyl chloride film.

The temperature of the recording medium when the ink droplets are landed thereon is preferably set to be lower than the gelation temperature of the ink by 10 to 20° C. If the temperature of the recording medium is excessively low, the ink droplets undergo gelation before leveling sufficiently occurs, and as a result, the glossiness of an image sometimes decreases. On the other hand, if the temperature of the recording medium is excessively high, it is difficult for the ink droplets to undergo gelation, and therefore neighboring dots of the ink droplets are easily mixed with each other (cannot be easily pinned). By appropriately adjusting the temperature of the recording medium, it is possible to achieve both a moderate level of leveling that does not allow for mixing among neighboring dots of the ink droplets, and appropriate pinning. The temperature of the recording medium can be adjusted by a later-described temperature control section of the inkjet recording apparatus.

Step 2)

A photopolymerizable compound contained in the ink is cured by irradiating the ink droplets attached on the recording medium with actinic radiation. Irradiation with actinic radiation can be carried out with a later-described actinic radiation light source of the inkjet recording apparatus.

Irradiation with actinic radiation is preferably carried out after ink droplets are discharged from all the inkjet recording heads. Irradiation with actinic radiation is carried out within 10 seconds, preferably 0.001 to 5 seconds, more preferably 0.01 to 2 seconds after the ink droplets are landed on the recording medium, in order to prevent neighboring ink droplets from combining In conventional recording methods, when the conveyance speed of a recording medium is set high, e.g., 50 m/min or more, ink droplets are to be irradiated with high illuminance light such as light with the maximum illuminance value of 5 W/cm$^2$ or more in order to cure the ink droplets in a short time. However, in the case of short-term irradiation with high illuminance light, the surface temperature of the recording medium becomes so high that gelated ink is molten and uniformity of glossiness of obtained image may decrease. Further, the ink is not easily cured sufficiently (a photopolymerizable compound in the ink is not sufficiently polymerized and crosslinked), surface curability and rubfastness of the image may decrease.

The inventors studied the illuminance conditions on a recording medium surface and found that in the case of long-term irradiation with low illuminance light such as light having a maximum illuminance value of less than 5 W/cm$^2$, not only melting of gelated ink due to (irradiation) heat can be prevented but also the ink can be cured sufficiently (an ink film with a high cure degree can be obtained) as compared to the case of short-term irradiation with high illuminance light, even when the accumulated amount of light is the same between the two cases.

Although the reason why an ink film with a higher cure degree can be obtained by long-term irradiation with low illuminance light still remains elusive, this is presumed as follows. In the case of short-term irradiation with high illuminance light, high concentrations of radical active species tend to be generated in the ink and therefore, leading to deactivation due to re-coupling of the radical active species and/or insufficient growth reaction of the polymerized or crosslinked product of the photopolymerizable compound. Thus, the molecular weight may not easily become large. In contrast, in the case of long-term irradiation with low illuminance light, high concentrations of radical active species are not easily generated in the ink, and moderate concentrations of radical active species can be maintained. Therefore, re-coupling of the radical active species do not easily occur, and inhibition of the growth reaction of the polymerized or crosslinked product of the photopolymerizable compound does not easily occur. Thus, the molecular weight may easily become large.

Therefore, in the present invention, it is preferable to irradiate with low illuminance light for a long time; that is to irradiate with light such that the illuminance on a recording medium surface is low and the length of an irradiated region of the recording medium surface in a conveyance direction of the recording medium is large. As used herein, "an irradiated region" means an irradiated region at "a certain time point" in the step of irradiating with actinic radiation.

Specifically, the maximum illuminance value on a recording medium surface is preferably in a range of 2 to 5 W/cm$^2$, and more preferably in a range of 2.5 to 4 W/cm$^2$. If the maximum illuminance value on the recording medium is more than 5 W/cm$^2$, the surface temperature of the recording medium becomes too high, so that a gelated ink is easily molten by irradiation heat. On the other hand, if the maximum illuminance value on the recording medium is less than 2 W/cm$^2$, the ink may not sufficiently be cured.

The irradiation time during which illuminance on the recording medium surface is 0.1 W/cm$^2$ or more is preferably 0.1 seconds or more, and more preferably 0.2 seconds or more in order to ensure enough time for a growth reaction of polymerized or crosslinked product of the photopolymerizable compound to occur. The irradiation time can be calculated using later-described irradiated region and conveyance speed.

The illuminance on the recording medium surface can be adjusted by illuminance, height H of the light-emitting surface (as measured from the recording medium surface) or the like of the actinic radiation light source. The illuminance on a recording medium surface can be measured using UV power meter C9536-02 (manufactured by Hamamatsu Photonics K.K).

The full width half maximum of illuminance of a distribution of illuminance (illuminance distribution) on an irradiated region of the recording medium surface along the conveyance direction of the recording medium is preferably 20 mm or more, more preferably 40 mm or more. Larger full width half maximum means greater length of an illuminance area contributing to curing ink in the conveyance direction of the recording medium. If the full width half maximum is less than 20 mm, the length of the illuminance area contributing to curing ink in the conveyance direction of the recording medium is small, so that when the recording speed is high, ink may not be cured sufficiently because the accumulated amount of light to the ink may be inadequate.

As illustrated in later-described FIGS. 3A to 3C, "the distribution of illuminance on an irradiated region of the recording medium surface along the conveyance direction of the recording medium" (illuminance distribution) is shown as a graph of illuminance (W/cm$^2$) against position (mm) from the origin in an irradiated region of the recording medium surface in the conveyance direction of the recording medium. The "origin in an irradiated region in the conveyance direction of the recording medium" is a position where illuminance in the conveyance direction becomes a maximum value, and typically the position is the midsection of the irradiated region in the conveyance direction of the recording medium. Although the illuminance distribution is typically symmetrical about the origin, the irradiated region can be controlled by making the distribution non-uniform for example by tilting the actinic radiation light source.

The full width half maximum of illuminance of the illuminance distribution on the irradiated region of the recording medium surface can be adjusted by the illuminance distribution of an actinic radiation light source, height H of a light-emitting surface, length L of the light-emitting surface in the conveyance direction or the like.

The light source of actinic radiation is preferably disposed such that the maximum illuminance value on the recording medium surface is in a range of 2 to 5 W/cm$^2$, and the full width half maximum of illuminance of the illuminance distribution is 20 mm or more. The above conditions can be satisfied by increasing height H of a light-emitting surface of the actinic radiation light source with high illuminance (e.g., 5 W/cm$^2$ or more) (a height of the light-emitting surface of the actinic radiation light source from the recording medium surface); or increasing length L of the light-emitting surface of the actinic radiation light source with low illuminance (e.g., less than 5 W/cm$^2$) in the conveyance direction in a later-described inkjet recording apparatus. When disposing an actinic radiation light source with high illuminance of 5 W/cm$^2$ or more, height H of the light-emitting surface is preferably set to 30 mm or more and less than 200 mm, and more preferably 50 mm or more and less than 100 mm. By setting height H to 30 mm or more and less than 200 mm, an image having excellent uniformity of glossiness, surface curability and rubfastness can be formed.

Also, irradiation time during which illuminance on the recording medium surface is 0.1 W/cm$^2$ or more is preferably 0.1 seconds or more, and more preferably 0.2 seconds or more. As illustrated in FIG. 3D, when the length in the conveyance direction is defined as X mm, and the conveyance speed as Y m/min in the case of illuminance of 0.1 W/cm$^2$ or more on the recording medium surface, irradiation time T can be calculated by $T=X/Y\times60/1{,}000$.

The accumulated amount of light of the irradiated actinic radiation is preferably less than 400 mJ/cm$^2$ and more preferably 350 mJ/cm$^2$ or less. The lower limit of the accumulated amount of light may be about 150 mJ/cm$^2$ in order to cure the ink to a certain degree or more. If the accumulated amount of light is more than 400 mJ/cm$^2$, the gelated ink on a recording medium may be melt by heat when the illuminance is high on the recording medium surface or the conveyance speed of the recording medium is low.

The irradiation time of actinic radiation may be set so that the accumulated amount of light satisfies the above range. The irradiation time of actinic radiation is, though it depends on the conveyance speed of a recording medium or illuminance on the recording medium surface, 0.1 seconds or more, and preferably 0.2 seconds or more.

The conveyance speed of the recording medium is preferably 50 to 120 m/min, and more preferably 60 to 120 m/min. When the conveyance speed is less than 50 m/min, productivity may decrease. On the other hand, when the conveyance speed is more than 120 m/min, the accumulated amount of light may be lacking and the ink is not cured sufficiently, so that the image quality may decrease.

The total thickness of a cured film of the ink is preferably in a range of 2 to 25 μm. As used herein, the total thickness of a cured film of the ink is the maximum thickness of the cured film of the ink attached on recording medium 12.

In an image forming method of the present invention, irradiation with actinic radiation is carried out at low illuminance for a long time; preferably the irradiation is carried out so that the maximum illuminance value on the recording medium surface is in a range of 2 to 5 W/cm$^2$ and the full width half maximum of illuminance of the above illuminance distribution is 20 mm or more. Thus, the melting of gelated ink droplets caused by excessive rise in temperature can be prevented and an image with high uniformity of glossiness can be obtained.

Further, since irradiation is carried out at low illuminance, radical active species are not generated in high concentrations, the conversion on rate of a photopolymerizable compound (monomer) is high, and the molecular weight of the polymerized or crosslinked product of the photopolymerizable compound may increase. Therefore, even though the conveyance speed of a recording medium is as high as 50 m/min or more, the ink can be cured sufficiently (a photopolymerizable compound in the ink can be sufficiently polymerized or crosslinked), so that an image with high surface curability and rubfastness can be obtained without sacrificing productivity.

Inkjet Recording Apparatus

An inkjet recording apparatus used for the image forming method of the present invention may be of line recording type (single pass recording type) or serial recording type. The inkjet recording apparatus is, though it depends on desired resolution or recording speed of an image, preferably line recording type (single pass recording type) in order to increase the recording speed.

Figure 1B:
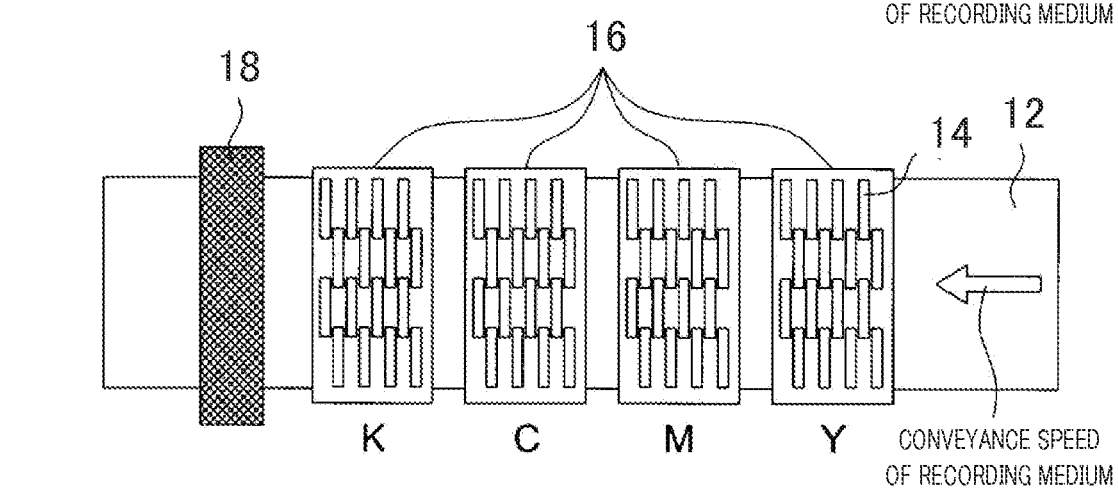
FIG. 1B is a bottom view of FIG. 1A.

FIG. 1A is a side view illustrating an example of the configuration of a main part of an inkjet recording apparatus of line recording type, and FIG. 1B is a bottom view of FIG. 1A.

As illustrated in FIG. 1A, inkjet recording apparatus 10 has head carriage 16 for accommodating a plurality of inkjet recording heads 14, ink channel 30 connected to head carriage 16, ink tank 31 for storing the ink to be fed via ink channel 30, and actinic radiation light source 18 covering the entire width of recording medium 12 and disposed at a downstream side of head carriage 16 (in the conveyance direction of the recording medium), and temperature control section 19 installed on a backside of recording medium 12.

Head carriage 16 is fixedly disposed so as to cover the entire width of recording medium 12 and accommodates a plurality of inkjet recording heads 14 that are installed for each color. Inkjet recording head 14 is designed to receive ink. For example, an ink can be supplied from a non-illustrated ink cartridge or the like that is attached in a freely-mountable manner to inkjet recording apparatus 10 directly or by non-illustrated means for ink supply.

A plurality of inkjet recording heads 14 is installed for each color in the conveyance direction of recording medium 12. The number of inkjet recording heads 14 that are disposed in the conveyance direction of recording medium 12 is determined based on the nozzle density of inkjet recording head 14 and the resolution of a printed image. For example, when an image having the resolution of 1,440 dpi is formed by using inkjet recording head 14 with a drop volume of 2 pl and a nozzle density of 360 dpi, four inkjet recording heads 14 may be disposed in a staggered manner relative to the conveyance direction of recording medium 12. Further, when an image having the resolution of 720×720 dpi is formed by using inkjet recording head 14 with a drop volume of 6 pl and a nozzle density of 360 dpi, two inkjet recording heads 14 may be disposed in a staggered manner. As used herein, dpi represents the number of liquid droplets (dots) per 2.54 cm.

Ink channel 30 is a passage for supplying an ink in ink tank 31 to head carriage 16. Ink tank 31 is connected to head carriage 16 via ink channel 30. To discharge ink droplets stably, a heating measure (not illustrated) to heat the ink in ink tank 31, ink channel 30, head carriage 16 and an inkjet recording head 14 may be provided.

Actinic radiation light source 18 covers the entire width of recording medium 12 and is disposed at a downstream side of head carriage 16 relative to the conveyance direction of the recording medium. Further, actinic radiation light source irradiates the liquid droplets which were discharged from inkjet recording head 14 and landed on the recording medium with light so as to cure the liquid droplets. Length L of a light-emitting surface of actinic radiation light source 18 in the conveyance direction of the recording medium is preferably the same as the width of the recording medium or longer.

Actinic radiation light source 18 is preferably, but not limited to, a surface emitting LED and more preferably a surface emitting UV-LED. The surface emitting UV-LED includes a substrate and a plurality of light-emitting elements disposed thereon, and may further include a lens or a diffuser panel in front of the light-emitting elements for adjusting light condensing or light diffusion where necessary.

The plurality of light-emitting elements can be disposed in any type of arrangement, and may be disposed in a hound's-tooth check-like form or in a positive grid-like form. Disposing in a hound's-tooth check-like form is preferable because light-emitting elements can be disposed densely, illuminance may be increased per unit area, and so on. The light-emitting elements can be formed on a substrate by well-known thin film deposition techniques.

The illuminance and illuminance distribution of actinic radiation light source 18 can be adjusted by the type of arrangement, number, density, or the like of the light-emitting elements.

The peak wavelength of the actinic radiation emitted from actinic radiation light source 18 is preferably in the UV range, for example, in a range of 360 nm to 420 nm, and more preferably in a range of 380 nm to 410 nm. The illuminance of actinic radiation light source 18 is in a range of about 2 to 17 $W/cm^2$, and preferably in a range of 4 to 12 $W/cm^2$. Actinic radiation light source 18 may be a high illuminance UV-LED available in the market.

As described above, actinic radiation light source 18 is preferably disposed such that the maximum illuminance value on the recording medium surface is in a range of 2 to 5 $W/cm^2$, and the full width half maximum of illuminance of the illuminance distribution is 20 mm or more. The above conditions can be satisfied by increasing height H of the light-emitting surface of actinic radiation light source 18 with high illuminance (e.g., 5 $W/cm^2$ or more); or increasing length L of the light-emitting surface of actinic radiation light source 18 with low illuminance (e.g., less than 5 $W/cm^2$). To increase length L of the light-emitting surface of actinic radiation light source 18 with low illuminance, length L of the light-emitting surface of one actinic radiation light source 18 may be increased, or a plurality of actinic radiation light sources 18 may be disposed so that the sum of the lengths of the light-emitting surfaces is made large. Increasing height H of the light-emitting surface of actinic radiation light source 18 with high illuminance is preferable because small actinic radiation light source 18 can be used.

Figure 2A:
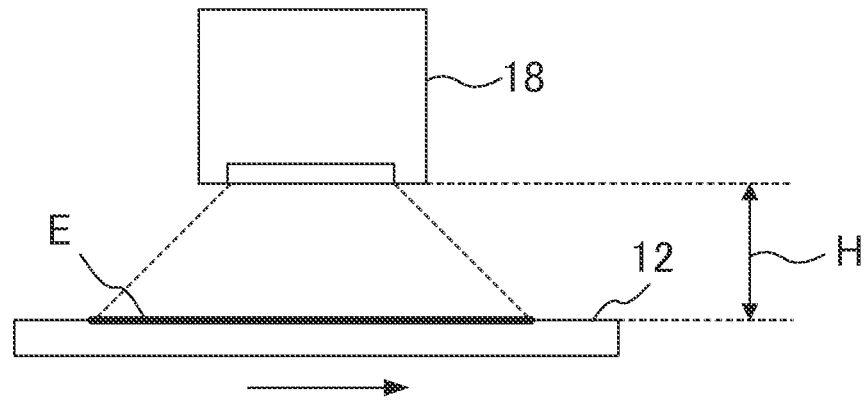
FIG. 2A is a schematic view illustrating an example of an actinic radiation light source installing mode of the present invention.
Figure 2B:
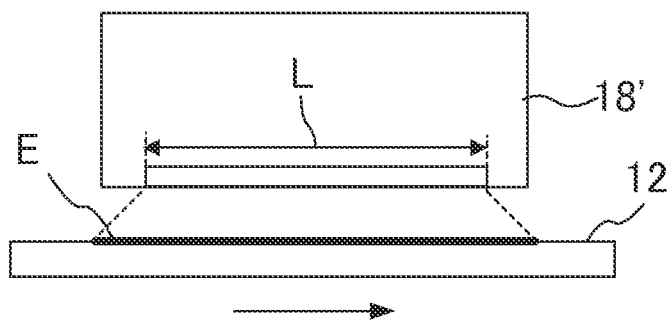
FIG. 2B is a schematic view illustrating an example of an actinic radiation light source installing mode of the present invention.
Figure 2C:
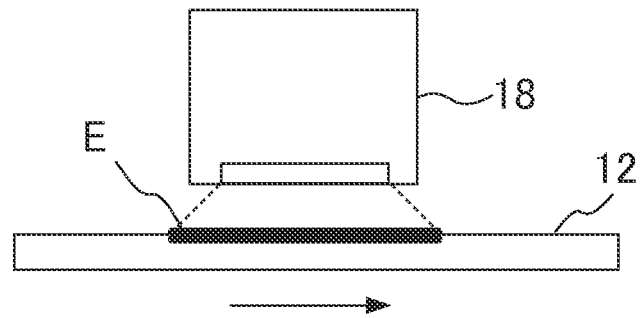
FIG. 2C is a schematic view illustrating an example of an actinic radiation light source installing mode of a conventional art.

FIGS. 2A and B are schematic views illustrating examples of actinic radiation light source 18 installing modes of the present invention and FIG. 2C is a schematic view illustrating an example of an actinic radiation light source installing mode of a conventional art. Arrows in the drawings represent a conveyance direction of recording medium 12.

When using actinic radiation light source 18 with high illuminance, illuminance on a recording medium surface can be reduced and the length of irradiated region E in the conveyance direction of the recording medium can be increased by increasing height H of the light-emitting surface of actinic radiation light source 18 (FIG. 2A) rather than decreasing height H of the light-emitting surface of actinic radiation light source 18 (FIG. 2C).

Height H of the light-emitting surface of actinic radiation light source 18 may be appropriately set according to the irradiation distribution of actinic radiation light source 18 or the conveyance speed of the recording medium. Height H of the light-emitting surface of actinic radiation light source 18 is preferably in a range of 30 mm or more to less than 200 mm, more preferably from 30 mm to 150 mm, and still more preferably from 50 mm to 100 mm in order to sufficiently cure ink on the recording medium even when the conveyance speed of the recording medium is high. When height H is less than 30 mm, illuminance on the recording medium surface becomes too high, and thus the surface temperature of the recording medium may become too high. On the other hand, when height H is 200 mm or more, illuminance on the recording medium becomes too low, and thus the ink may not be cured sufficiently.

When using actinic radiation light source 18' with low illuminance, the length of irradiated region E of the recording medium in the conveyance direction can be increased by increasing length L in the conveyance direction of a light-emitting surface (of recording medium) of actinic radiation light source 18' with low illuminance (FIG. 2B).

Length L in the conveyance direction of the light-emitting surface of actinic radiation light source 18 is, though it depends on the illuminance on the recording medium surface, preferably, for example, 20 mm or more, more preferably 40 mm or more, and still more preferably 60 mm or more. The upper limit of length L in the conveyance direction of the light-emitting surface of actinic radiation light source 18 may be, for example, about 150 mm.

One or more actinic radiation light sources 18' with low illuminance may be disposed.

When height H of the light-emitting surface of actinic radiation light source 18 is large, light diffused from actinic radiation light source 18 reflects off the recording medium surface and may hit a discharging surface of inkjet recording head 14. However, the ink to be discharged is heated on the discharging surface and becomes a sol state ink with low viscosity, and thus the ink is easily affected by oxygen inhibition. Therefore, discharging failure due to curing of the ink on the discharging surface of inkjet recording head 14 probably does not occur.

On the other hand, a cover for covering the entire width of recording medium 12 (not illustrated) may further be disposed on the region where actinic radiation light source 18 is disposed to prevent the light diffused from actinic radiation light source 18 from hitting inkjet recording head 14 via the recording medium surface. The cover form is preferably angled in the conveyance direction (of the recording medium) in order that the ink on the recording medium can be sufficiently irradiated with the diffused light, with reference to the illuminance distribution of actinic radiation light source 18. As for the cover material, the inside surface of the cover (opposite side to the recording medium surface) is preferably composed of, but not limited to, a metallic material, such as aluminum, which reflects light to enhance curability of ink on the recording medium.

Temperature control section 19 is installed on a backside of recording medium 12 and maintains the temperature of recording medium 12 at a predetermined temperature. Temperature control section 19 may be, for example, a heater or the like.

EXAMPLES

Hereinafter, the present invention will be described in detail with reference to the examples. However, it is not intended to limit the present invention to the examples.

1. Ink Materials
1) Photopolymerizable Compound

MK Ester A-400 (polyethylene glycol #400 diacrylate, manufactured by Shin Nakamura Chemical Co., Ltd.)

MK Ester A-600 (polyethylene glycol #600 diacrylate, manufactured by Shin Nakamura Chemical Co., Ltd.)

SR499 (6EO-modified trimethylolpropane triacrylate, manufactured by Sartomer Company, Inc.)

PHOTOMER 4072 (3PO-modified trimethylolpropane triacrylate, manufactured by Cognis GmbH)

2) Photopolymerization Initiator

DAROCURE TPO (phosphine oxide, manufactured by BASF)

IRGACURE 819 (phosphine oxide, manufactured by BASF)

IRGACURE 369 (α-aminoalkylphenone, manufactured by BASF)

SPEEDCURE ITX (manufactured by DKSH)

3) Polymerization Inhibitor

IRGASTAB UV10 (manufactured by BASF)

4) Gelling Agent

Distearyl ketone (manufactured by Kao Corporation)

Behenyl behenate (manufactured by NOF Corporation)

5) Surfactant

KF352 (manufactured by Shin-Etsu Chemical Company)

2. Preparation of Ink

Preparation of Pigment Dispersion (Pigment Dispersion 1)

The following compounds were put into a stainless beaker and stirred for 1 hour for dissolution under heating at 65° C. on a hot plate.

Ajisper PB824 (manufactured by Ajinomoto Fine-Techno Co., Inc.): 9 parts by weight Tripropylene glycol diacrylate (APG-200, manufactured by Shin-Nakamura Chemical Co., Ltd.): 71 parts by weight After cooling the obtained solution to room temperature, 20 parts by weight of pigment 1: Pigment Black 7 (manufactured by Mitsubishi Chemical Company, #52) was added, and put and sealed together with 200 g of zirconia beads having a diameter of 0.5 mm into a glass bottle. After the treatment for dispersion for five hours using a paint shaker, the zirconia beads were removed.

(Pigment Dispersion 2)

Pigment dispersion 2 was obtained in the same manner as pigment dispersion 1 except that pigment 2: Pigment Blue 15:4 (manufactured by Dainichiseika Colour & Chemicals Mfg. Co., Ltd., Chromo Fine Blue 6332JC) was used instead of pigment 1.

(Pigment Dispersion 3)

Pigment dispersion 3 was obtained in the same manner as pigment dispersion 1 except that pigment 3: Pigment Red 122 (manufactured by Dainichiseika Colour & Chemicals Mfg. Co., Ltd., Chromo Fine Red 6112JC) was used instead of pigment 1, and the treatment for dispersion was carried out for 8 hours.

(Pigment Dispersion 4)

Pigment dispersion 4 was obtained in the same manner as pigment dispersion 1 except that pigment 4: Pigment Yellow 180 (manufactured by Dainichiseika Colour & Chemicals Mfg. Co., Ltd., Chromo Fine Yellow 6280JC) was used instead of pigment 1, and the treatment for dispersion was carried out for 8 hours.

Preparation of Ink (Ink K1, C1, M1 and Y1)

Components as listed in table 1 were mixed, heated to 80° C. and stirred. The obtained solutions were filtered through #3000 metal mesh filter under heating, and then were cooled to afford inks K1, C1, M1 and Y1. Thus, ink set 1 including ink K1, C1, M1 and Y1 was obtained.

(Inks K2, C2, M2 and Y2)

Inks K2, C2, M2 and Y2 were obtained in the same manner as ink K1 except that the ink components were changed as listed in Table 1. Also, ink set 2 including ink K2, C2, M2 and Y2 was obtained.

Components of the inks are shown in Table 1.

TABLE 1

|  |  | Ink set 1 | | | | Ink set 2 | | | |
| --- | --- | --- | --- | --- | --- | --- | --- | --- | --- |
|  |  | K1 | C1 | M1 | Y1 | K2 | C2 | M2 | Y2 |
| Pigment Dispersion | 1 | 12.5 |  |  |  | 12.5 |  |  |  |
|  | 2 |  | 12.5 |  |  |  | 12.5 |  |  |
|  | 3 |  |  | 21.0 |  |  |  | 21.0 |  |
|  | 4 |  |  |  | 15.0 |  |  |  | 15.0 |
| Photopolymerizable Compound | MK Ester A-400 (manufactured by Shin Nakamura Chemical Co., Ltd.) | 8.0 | 8.0 | 8.0 | 8.0 | 8.0 | 8.0 | 8.0 | 8.0 |
|  | MK Ester A-600 (manufactured by Shin Nakamura Chemical Co., Ltd.) | 12.0 | 12.0 | 12.0 | 12.0 | 12.0 | 12.0 | 12.0 | 12.0 |
|  | SR499 (manufactured by Sartomer Company, Inc.) | 26.5 | 28.5 | 20.0 | 24.0 | 29.3 | 31.3 | 22.8 | 26.8 |
|  | PHOTOMER 4072 (manufactured by Cognis GmbH) | 30.0 | 30.0 | 30.0 | 30.0 | 30.0 | 30.0 | 30.0 | 30.0 |
| Photopolymerization Initiator | DAROCURE TPO (manufactured by BASF) | 3.0 | 3.0 | 3.0 | 3.0 | 3.0 | 3.0 | 3.0 | 3.0 |
|  | IRGACURE 819 (manufactured by BASF) | 2.0 |  |  | 2.0 | 2.0 |  |  | 2.0 |
|  | IRGACURE 369 (manufactured by BASF) | 1.0 | 1.0 | 1.0 | 1.0 | 1.0 | 1.0 | 1.0 | 1.0 |
|  | SPEEDCURE ITX (manufactured by DKSH) | 2.0 | 2.0 | 2.0 | 2.0 | 2.0 | 2.0 | 2.0 | 2.0 |
| Polymerization Inhibitor | UV10 (manufactured by BASF) | 0.2 | 0.2 | 0.2 | 0.2 | 0.2 | 0.2 | 0.2 | 0.2 |
| Gelling Agent | Distearyl ketone (manufactured by Kao Corporation) | 2.0 | 2.0 | 2.0 | 2.0 | — | — | — | — |
|  | Behenyl behenate (manufactured by NOF Corporation) | 0.8 | 0.8 | 0.8 | 0.8 | — | — | — | — |
| Surfactant | KF352 (manufactured by Shin-Etsu Chemical Company) | 0.05 | 0.05 | 0.05 | 0.05 | 0.05 | 0.05 | 0.05 | 0.05 |

Example 1

The obtained ink set 1 was loaded in an inkjet recording apparatus. The inkjet recording head of the inkjet recording apparatus is equipped with piezo type inkjet nozzles. Using the inkjet recording apparatus in which ink set 1 was loaded, an image was formed on A4-sized coated paper (OK KINFUJI, basis weight: 104.7 g/m2, manufactured by Oji Paper Co., Ltd.) under the following conditions.

The ink supplying system of the inkjet recording apparatus is composed of an ink tank, an ink channel, a sub-ink tank immediately before the inkjet recording head, filter-attached piping, and a piezo head. The ink from the ink tank to the piezo head was warmed to 90° C. The piezo head was warmed using a heater disposed inside the head so that the ink temperature in the head would be 80° C. Also the coated paper was warmed so that the surface temperature would be 50° C.

A voltage was applied so that discharge amount per droplet from the piezo head was 3 pl, and the inks were discharged using four heads at a resolution of 360 dpi for each color. Thus, a solid image or natural image was formed that has a resolution of 1,440×1,440 dpi for each of YMCK and ink deposition amount of 7.5 g/m2 for each color.

The ink attached on the coated paper was cured by irradiation with ultraviolet rays using UV-LED lamp (peak wavelength; 395 nm). Height H of the light-emitting surface of UV-LED lamp 1 was 50 mm when carrying out the irradiation with ultraviolet rays. The maximum illuminance value on the coated paper surface was 3.8 W/cm2, the full width half maximum of illuminance distribution on the coated paper surface was 64 mm and the irradiation time of light with illuminance of 0.1 W/cm2 or more on the coated paper surface was 0.12 seconds. The conveyance speed of the coated paper was 60 m/min and the accumulated amount of light was 310 mJ/cm2. The illuminance on the coated paper was measured using UV power meter C9536-02 (manufactured by Hamamatsu Photonics K.K).

Examples 2 to 8 and Comparative Examples 1 to 13

An image was formed in the same manner as Example 1 except that at least one of the ink set type, the irradiation condition of ultraviolet rays, and the conveyance speed of a coated paper was changed as shown in table 2. The peak wavelength of UV-lamp 2 shown in table 2 was 395 nm, and the peak wavelength of UV-lamp 3 was 395 nm.

The quality (uniformity of glossiness) and curability (scratch resistance, rubfastness and surface curability) of the images obtained in Examples and Comparative Examples were evaluated as follows.

1) Uniformity of Glossiness

According to the above image forming conditions and method, a natural image (high-resolution color digital standard image data "fruit basket" issued by Japanese Standards Association) was formed using four YMCK color inks on coated paper (OK KINFUJI, basis weight: 104.7 g/m2, manufactured by Oji Paper Co., Ltd.). The obtained image was visually observed and uniformity of glossiness was evaluated according to the following criteria.

A: No difference in glossiness is recognized when the image is observed at a position 15 cm apart from the image.

B: Differences in glossiness are recognized in a part of the image when the image is observed at a position 15 cm apart from the image but the image is practically acceptable.

C: Significant differences in glossiness are recognized in the entire part of the image when the image is observed at a position 15 cm apart from the image, and the quality of the image is practically intolerable.

2) Scratch Resistance

According to the above image forming conditions and method, solid images of YMCK colors and BGR secondary colors each were formed on coated paper (OK KINFUJI, basis weight: 104.7 g/m2, manufactured by Oji Paper Co., Ltd.). After scratching each obtained image with a nail, an extent of blank image was visually observed. Scratch resistance was evaluated according to the following criteria.

A: For all colors, absolutely no blank is recognized in the images.

B: Some blanks are recognized in the images of G and K colors, but the images are practically acceptable.

C: Obvious blanks are recognized in the images of G, K, and Y colors, and the qualities of the images are practically intolerable.

3) Rubfastness

According to the above image forming conditions and method, solid images of YMCK colors and BGR secondary colors were formed on coated paper (OK KINFUJI, basis weight: 104.7 g/m2, manufactured by Oji Paper Co., Ltd.). In accordance with the method described in "JIS Standards K5701-1 6.2.3 Rub Resistance Test," a sheet of coated paper for printing A cut in a size of 4 cm2 was placed on each obtained solid image, a load of 500 g was applied thereon, and the paper sheet was rubbed against the image. Thereafter, the sheet of coated paper for printing A was removed, and an extent of decrease in the density of the image was visually observed. Scratch resistance was evaluated according to the following criteria.

A: Even though the image is rubbed 30 strokes or more with the paper sheet, absolutely no change is recognized in the image density.

B: Decrease in the image density is recognized at the time when the image has been rubbed for 30 strokes, but the image is practically acceptable.

C: Obvious decrease in the density of the image is recognized at the time when the image has been rubbed fewer than 30 strokes, and the quality of the image is practically intolerable.

4) Surface Curability

According to the above image forming conditions and method, solid images of YMCK colors and BGR secondary colors each were formed on coated paper (OK KINFUJI, basis weight: 104.7 g/m2, manufactured by Oji Paper Co., Ltd.). Immediately thereafter, each image was rubbed with a fingertip and whether or not the image surface changed was confirmed by visual observation. Surface curability was evaluated according to the following criteria.

A: For all colors, absolutely no change on the image surface is recognized.

B: Rubbed traces can be confirmed in the images of C and B colors, but the images are practically acceptable.

C: Rubbed traces can be confirmed in all colors. Further, color migration of the pigment in the images of C and B colors is recognized, and the quality of the images is practically intolerable.

5) Productivity

Productivity was evaluated according to the following criteria.

A: The conveyance speed of a recording medium is 50 m/min or more, and productivity is high.

B: The recording speed is 30 m/min or more and less than 50 m/min, and productivity is practically acceptable.

C: The recording speed is less than 30 m/min, and productivity is not practical.

Evaluation results of Examples 1 to 8, and Comparative Examples 1 to 13 are shown in Table 2. FIG. 3A illustrates illuminance distributions of UV-LED lamp 1 used in the Examples and Comparative Examples on irradiated regions of recording medium surfaces; FIG. 3B illustrates an illuminance distribution of UV-LED lamp 2 on an irradiated region of a recording medium surface; FIG. 3C illustrates a illuminance distribution of UV-LED lamp 3 on an irradiated region of a recording medium surface.

Figure 3A:
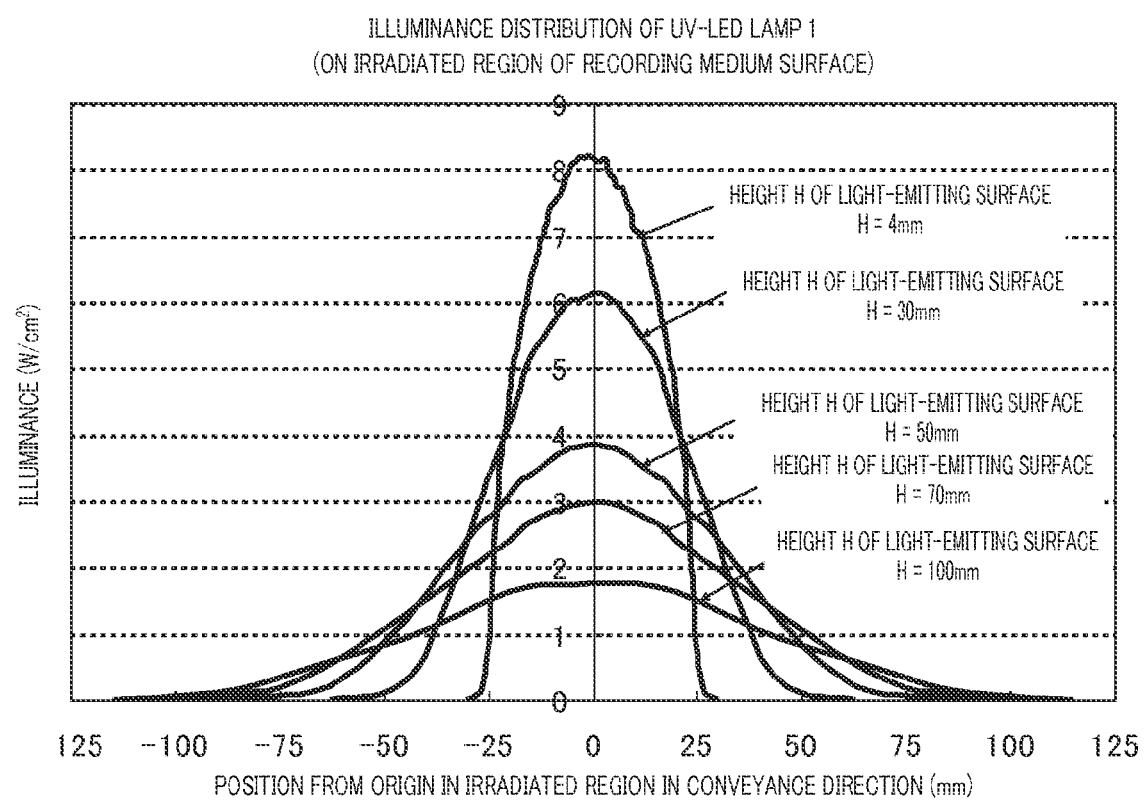
FIG. 3A is a graph illustrating an illuminance distribution of UV-LED lamp 1 used in Examples on an irradiated region of a recording medium surface.
Figure 3B:
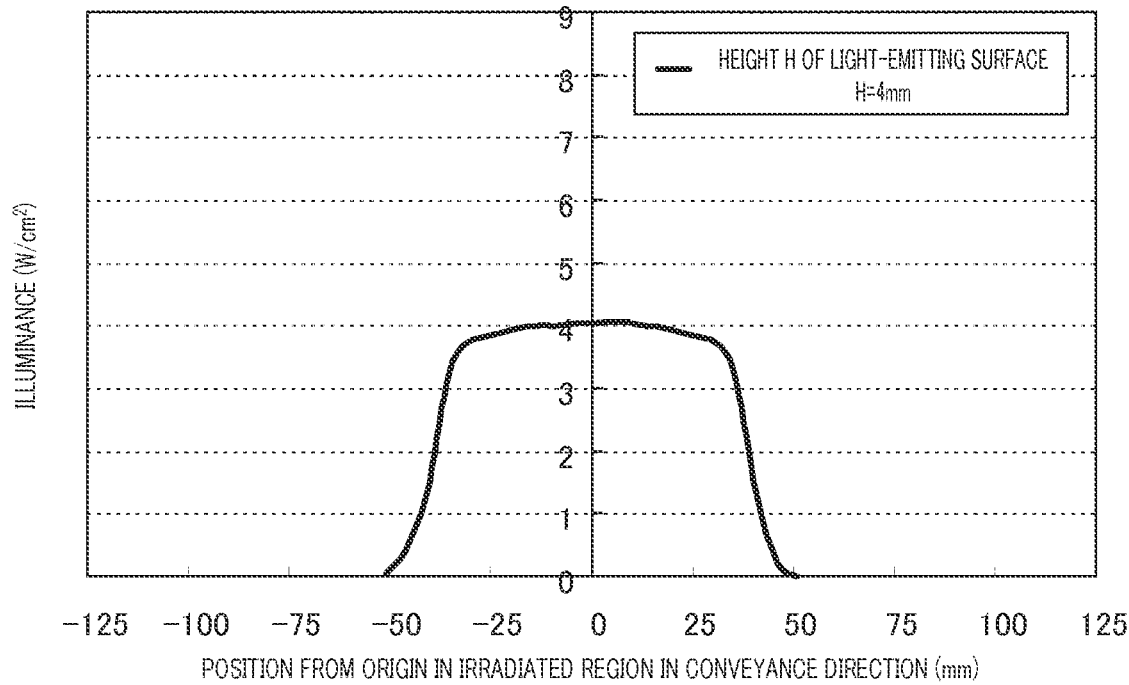
FIG. 3B is a graph illustrating an illuminance distribution of UV-LED lamp 2 used in Examples on an irradiated region of a recording medium surface.
Figure 3C:
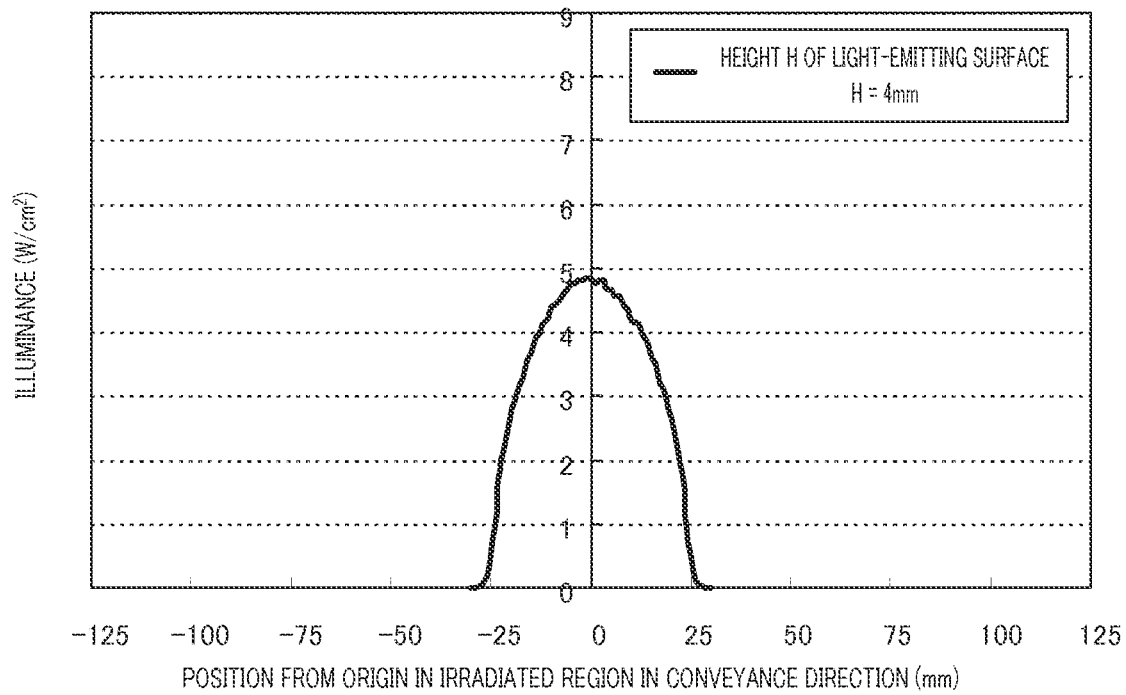
FIG. 3C is a graph illustrating an illuminance distribution of UV-LED lamp 3 used in Examples on an irradiated region of a recording medium surface.
Figure 3D:
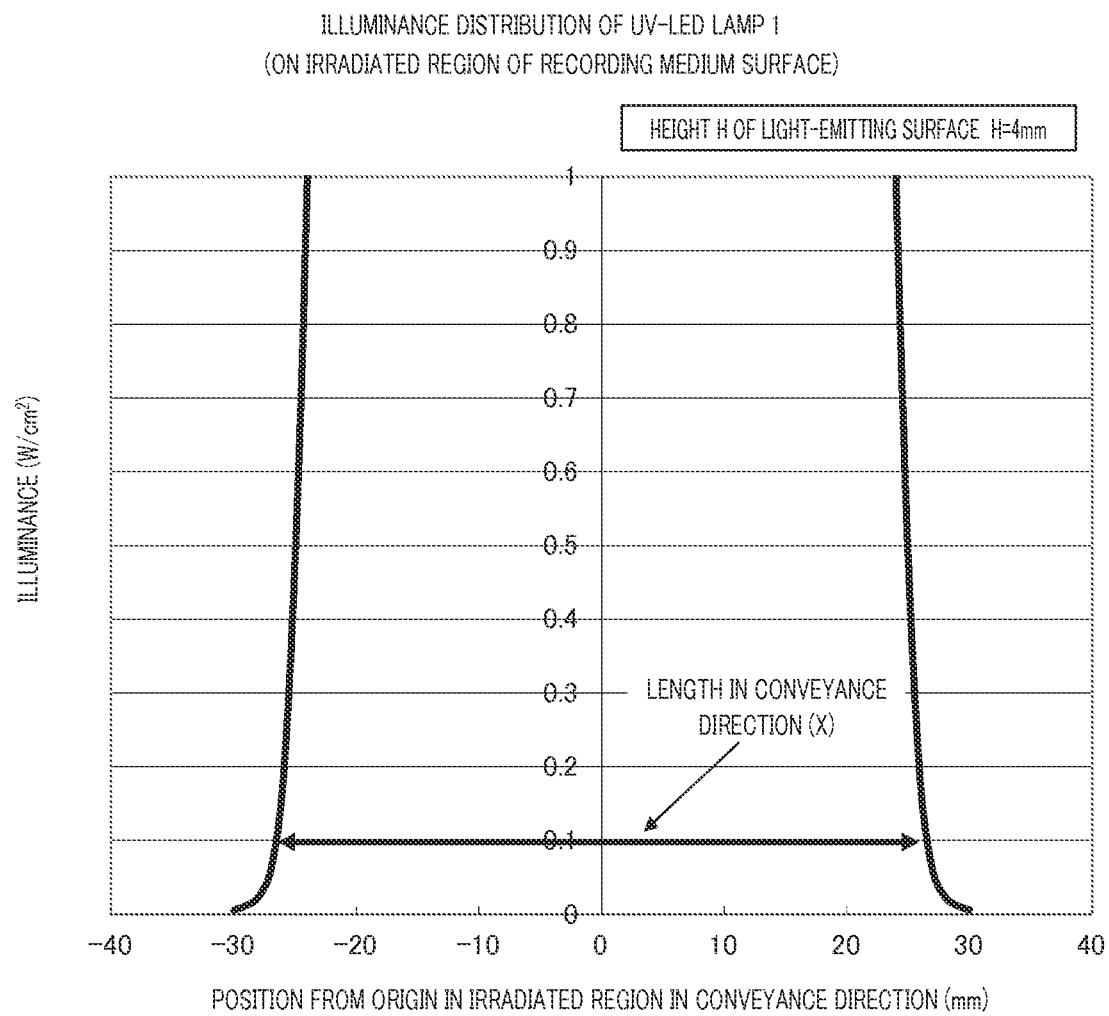
FIG. 3D is a graph illustrating an example of calculation of an irradiation time from an irradiation distance when the illuminance on a recording medium surface is 0.1 W/cm$^2$ or more.

In FIGS. 3A to 3C, the abscissa represents a position from a origin in the irradiated region in the conveyance direction of the recording medium (mm); and the ordinate represents illuminance (W/cm2) at each position. "A origin in the irradiated region in the conveyance direction of the recording medium" is a position where illuminance on the recording medium in the conveyance direction of the recording medium becomes a maximum value; and typically, the illuminance distribution is symmetrical about the origin.

TABLE 2

| | Ink set No. | Height H of light-emitting surface (mm) | Maximum illuminance value (W/cm$^2$) | Irradiation time during which illuminance on recording medium surface is 0.1 W/cm$^2$ or more (sec) | Full width half maximum of illuminance distribution (mm) | Accumulated amount of light (mJ/cm$^2$) | Light source No. |
|---|---|---|---|---|---|---|---|
| Example 1 | 1 | 50 | 3.8 | 0.12 | 64 | 310 | 1 |
| Example 2 | 1 | 70 | 3.0 | 0.17 | 72 | 310 | 1 |
| Example 3 | 1 | 50 | 3.8 | 0.1 | 64 | 233 | 1 |
| Example 4 | 1 | 4 | 4.0 | 0.1 | 72 | 310 | 3 |
| Example 5 | 1 | 30 | 3.0 | 0.18 | 97 | 310 | 3 |
| Example 6 | 1 | 4 | 4.8 | 0.05 | 42 | 180 | 2 |
| Example 7 | 1 | 4 | 4.8 | 0.06 | 42 | 216 | 2 |
| Example 8 | 1 | 4 | 4.8 | 0.1 | 42 | 360 | 2 |
| Comparative Example 1 | 1 | 4 | 8.2 | 0.05 | 40 | 310 | 1 |
| Comparative Example 2 | 1 | 30 | 6.1 | 0.1 | 54 | 310 | 1 |
| Comparative Example 3 | 1 | 100 | 0.8 | 0.18 | 160 | 310 | 1 |
| Comparative Example 4 | 1 | 4 | 8.2 | 0.08 | 40 | 465 | 1 |
| Comparative Example 5 | 1 | 30 | 6.1 | 0.15 | 54 | 465 | 1 |
| Comparative Example 6 | 1 | 100 | 0.8 | 0.28 | 160 | 465 | 1 |
| Comparative Example 7 | 1 | 4 | 8.2 | 0.16 | 40 | 930 | 1 |
| Comparative Example 8 | 1 | 30 | 6.1 | 0.3 | 54 | 930 | 1 |
| Comparative Example 9 | 1 | 100 | 1.7 | 0.55 | 94 | 930 | 1 |
| Comparative Example 10 | 1 | 4 | 8.0 | 0.05 | 18 | 140 | — |
| Comparative Example 11 | 1 | 4 | 16.5 | 0.05 | 18 | 310 | — |
| Comparative Example 12 | 2 | 4 | 8.2 | 0.05 | 40 | 310 | 1 |
| Comparative Example 13 | 2 | 50 | 3.8 | 0.12 | 64 | 310 | 1 |

| | Conveyance speed (m/min) | Image quality evaluation Uniformity of Glossiness | Curability evaluations | | | Productivity |
|---|---|---|---|---|---|---|
| | | | Scratch Resistance | Rubfastness | Surface Curability | |
| Example 1 | 60 | A | A | A | A | A |
| Example 2 | 60 | A | A | A | A | A |
| Example 3 | 80 | A | B | A | A | A |
| Example 4 | 60 | A | A | A | A | A |
| Example 5 | 60 | A | A | A | A | A |
| Example 6 | 60 | A | B | B | A | A |
| Example 7 | 50 | A | B | A | A | B |
| Example 8 | 30 | A | A | A | A | B |
| Comparative Example 1 | 60 | C | C | B | C | A |
| Comparative Example 2 | 60 | B | B | B | B | A |
| Comparative Example 3 | 60 | B | C | B | B | A |
| Comparative Example 4 | 40 | C | B | B | C | B |

TABLE 2-continued

| | | | | | | |
|---|---|---|---|---|---|---|
| Comparative Example 5 | 40 | B | B | A | B | B |
| Comparative Example 6 | 40 | B | B | B | B | B |
| Comparative Example 7 | 20 | C | A | B | C | C |
| Comparative Example 8 | 20 | B | A | A | B | C |
| Comparative Example 9 | 20 | B | B | A | B | C |
| Comparative Example 10 | 60 | C | C | C | C | A |
| Comparative Example 11 | 60 | C | C | B | C | A |
| Comparative Example 12 | 60 | C | C | C | C | A |
| Comparative Example 13 | 60 | C | C | C | C | A |

As shown in table 2, images obtained in Examples 1 to 8 all have high uniformity of glossiness and curability compared to images obtained in Comparative Examples 1 to 13.

Specifically, Examples 1 and 2 are compared with Comparative Examples 1 to 3. In Examples 1 and 2, where the maximum illuminance value is 5.0 W/cm² or less, uniformity of glossiness of images is high and curability of the images is also high because melt of ink surfaces is small. On the other hand, in Comparative Example 3, where the maximum illuminance value is less than 2.0 W/cm², uniformity of glossiness of image is practically acceptable because melt of ink surfaces is small, but curability is low.

Further, even when using the same light source, the maximum illuminance value or full width half maximum of irradiation distribution on the coated paper can be adjusted by height H of the light-emitting surface. Specifically, in Examples 1 and 2, where height H of the light-emitting surface is more than 30 mm, the maximum illuminance value is as low as 5.0 W/cm² or less, and the full width half maximum of irradiation distribution is as large as 64 mm or more. On the other hand, in Comparative Examples 1 and 2, where height H of the light-emitting surface is 30 mm or less, the maximum illuminance value is as high as more than 5.0 W/cm², and the full width half maximum of irradiation distribution is as small as 60 mm or less.

In Comparative Example 10, where the full width half maximum of the maximum illuminance value is less than 20 mm, curability is low compared to Comparative Example 1, where the full width half maximum of the maximum illuminance value is more than 20 mm, because the accumulated amount of light is too small. In Comparative Example 11, where the full width half maximum of the maximum illuminance value is less than 20 mm but the maximum illuminance value is 16.5 W/cm², the accumulated amount of light is sufficient, but uniformity of glossiness and curability are low because the ink surface is molten as Comparative Example 1. When comparing Example 5 and Comparative Example 11, it can be understood that uniformity of glossiness and curability are higher in the case of irradiation with low illuminance light with maximum illuminance value of 3 W/cm² for as long as 0.18 seconds than in the case of irradiation with high illuminance light with maximum illuminance value of 16.5 W/cm² for as short as 0.05 seconds, even though the accumulated amount of light is the same of 310 mJ/cm².

Comparative Examples 1, 4 and 7 will be compared. When the conveyance speed of a recording medium becomes low, the accumulated amount of light increases, whereby curability becomes high but productivity becomes low.

This application claims priority based on Japanese patent Application No. 2012-103213, filed by the same applicant on Apr. 27, 2012, the entire contents of which including the specification and the drawings are incorporated herein by reference.

INDUSTRIAL APPLICABILITY

According to the present invention, an actinic radiation-curable inkjet ink recording method which can form an image having excellent uniformity of glossiness, surface curability, and rubfastness with high productivity can be provided.

REFERENCE SIGNS LIST

10 Inkjet recording apparatus
12 Recording medium
14 Inkjet recording head
16 Head carriage
18, 18' Actinic radiation light source
19 Temperature control section
30 Ink channel
31 Ink tank

The invention claimed is:

1. An image forming method comprising:
   discharging an actinic radiation-curable inkjet ink which undergoes temperature-induced sol-gel phase transition to a recording medium, the actinic radiation-curable inkjet ink containing a photopolymerizable compound, a photopolymerization initiator and a gelling agent; and
   curing the discharged actinic radiation-curable inkjet ink on the recording medium by irradiation with actinic radiation, wherein
   the irradiation with actinic radiation is carried out so that a maximum irradiance value on a surface of the recording medium is in a range of 2 to 5 W/cm², and a full-width-at-half-maximum (FWHM) of irradiance in a distribution of irradiance on an irradiated region of the surface of the recording medium along a conveyance direction of the recording medium is 20 mm or more.

2. The image forming method according to claim 1, wherein the irradiation with actinic radiation is carried out using an actinic radiation light source, and a height of a light-emitting surface of the actinic radiation light source from the surface of the recording medium is 30 mm or more and less than 200 mm.

3. The image forming method according to claim 2, wherein the actinic radiation light source is a light-emitting diode with a peak wavelength of in a range of 360 nm to 420 nm.

4. The image forming method according to claim 1, wherein an irradiation time during which irradiance on the recording medium surface is 0.1 W/cm² or more is 0.1 seconds or more.

5. The image forming method according to claim 1, wherein a conveyance speed of the recording medium is 50 m/min or more.

6. The image forming method according to claim 1, wherein an accumulated amount of light of the actinic radiation applied is less than 400 mJ/cm².

7. The image forming method according to claim 1, wherein the photopolymerizable compound contains a (meth)acrylate having a C log P value in a range of 4.0 to 7.0.

8. The image forming method according to claim 1, wherein the photopolymerizable compound contains a (meth)acrylate having a structure represented by (—C(CH$_3$)H—CH$_2$—O—)$_m$, wherein m is an integer of 3 to 14, or a cyclic structure in the molecule.

9. The image forming method according to claim 1, wherein the photopolymerizable compound contains ethylene oxide-modified (meth)acrylate compound.

10. The image forming method according to claim 1, wherein the photopolymerizable compound contains a (meth)acrylate having a C log P value in a range of 4.0 to 7.0 and ethylene oxide-modified (meth)acrylate compound.

11. The image forming method according to claim 1, wherein the gelling agent is selected from a group consisting of aliphatic ketone compound, aliphatic ester compound, petroleum-based wax, plant wax, animal wax, mineral wax, hardened castor oil, hardened castor oil derivative, modified wax, higher fatty acid, higher alcohol, hydroxystearic acid, hydroxystearic acid derivative, fatty amide, N-substituted fatty acid amide, special fatty acid amide, higher amine, fatty acid ester, sucrose fatty acid ester, synthetic wax, dimer acid, dimer diol, fatty acid inulin, fatty acid dextrin, glyceryl behenate eicosanedioate, polyglyceryl eicosane behenate, amide compound, dibenzylidene sorbitol, and low-molecular weight oil gallant agent.

12. The image forming method according to claim 1, wherein the gelling agent contains a compound represented Formula (G1) or (G2):

R1-CO—R2   Formula (G1):

R3-COO—R4   Formula (G2):

wherein R1 to R4 each independently represent an alkyl chain having a straight-chain moiety 12 or more carbon atoms.

13. The image forming method according to claim 12, wherein the gelling agent is selected from a group consisting of dilignoceryl ketone (C24-C24), dibehenyl ketone (C22-C22), distearyl ketone (C18-C18), dieicosyl ketone (C20-C20), dipalmityl ketone (C16-C16), dimyristyl ketone (C14-C14), dilauryl ketone (C12-C12), lauryl myristyl ketone (C12-C14), lauryl palmityl ketone (C12-C16), myristyl palmityl ketone (C14-C16), myristyl stearyl ketone (C14-C18), myristyl behenyl ketone (C14-C22), palmityl stearyl ketone (C16-C18), palmityl behenyl ketone (C16-C22), stearyl behenyl ketone (C18-C22), behenyl behenate (C21-C22), icosyl icosanoate (C19-C20), stearyl stearate (C17-C18), palmityl stearate (C17-C16), lauryl stearate (C17-C12), cetyl palmitate (C15-C16), stearyl palmitate (C15-C18), myristyl myristate (C13-C14), cetyl myristate (C13-C16), octyl dodecyl myristate (C13-C20), stearyl oleate (C17-C18), stearyl erucate (C21-C18), stearyl linolate (C17-C18), behenyl oleate (C18-C22), myricyl cerotate (C25-C16), stearyl montanate (C27-C18), behenyl montanate (C27-C22), arachidyl linolate (C17-C20), and palmityl triacontanate (C29-C16).

14. The image forming method according to claim 1, wherein the photopolymerization initiator contains an intramolecular bond cleavage type initiator or an intramolecular hydrogen abstraction type initiator.

15. The image forming method according to claim 1, wherein the ink contains a pigment.

16. The image forming method according to claim 1, wherein a viscosity of the ink is 1,000 mPa·s or more at 25° C.

17. The image forming method according to claim 1, wherein a temperature of the ink inside an inkjet recording head is set to be higher than the gelation temperature by 10 to 30° C.

18. The image forming method according to claim 1, wherein a temperature of the recording medium when and where the ink landed, is set to be lower than the gelation temperature by 10 to 20° C.

19. The image forming method according to claim 1, wherein the image forming is operated by a line recording type inkjet apparatus.

20. The image forming method according to claim 1, wherein the irradiation with actinic radiation is carried out by surface emitting LED.

21. The image forming method according to claim 1, wherein a light-emitting element which irradiate the actinic radiation has a lens or diffuser panel.

* * * * *